Feb. 12, 1924.  
T. B. COUCH  
FISHING TOOL  
Filed April 10, 1922  
1,483,079

Inventor
Thomas B. Couch
By
Hardway & Cathey
Attorneys

Patented Feb. 12, 1924.

1,483,079

UNITED STATES PATENT OFFICE.

THOMAS B. COUCH, OF WICHITA FALLS, TEXAS.

FISHING TOOL.

Application filed April 10, 1922. Serial No. 551,022.

*To all whom it may concern:*

Be it known that I, THOMAS B. COUCH, citizen of the United States, residing at Wichita Falls, in the county of Wichita and State of Texas, have invented certain new and useful Improvements in a Fishing Tool, of which the following is a specification.

This invention relates to new and useful improvements in a fishing tool.

One object of the invention is to provide a tool of the character described which has been specially designed to be let down into a well bore for the purpose of engaging with pipe in said bore and withdrawing the same.

In drilling wells pipe often becomes twisted off and left in the bore and not infrequently the upper end of the pipe falls over against the wall of the bore and sometimes becomes embedded therein so that the ordinary fishing tool can not be engaged over, or within the pipe. It is the object of this invention to provide a fishing tool which may be readily engaged with the pipe to straighten the same up in the bore, as well as engage thereover and grip the pipe and remove the same from the bore.

Another object of the invention is to provide a fishing tool which is of simple construction and consequently may be cheaply and easily manufactured and which is very effective for the purposes for which it is intended.

With the above and other objects in view the invention has particular relation to certain novel features of construction, operation and arrangement of parts, an example of which is given in this specification and illustrated in the accompanying drawings, wherein:—

Figures 1, 2, 3, 4:
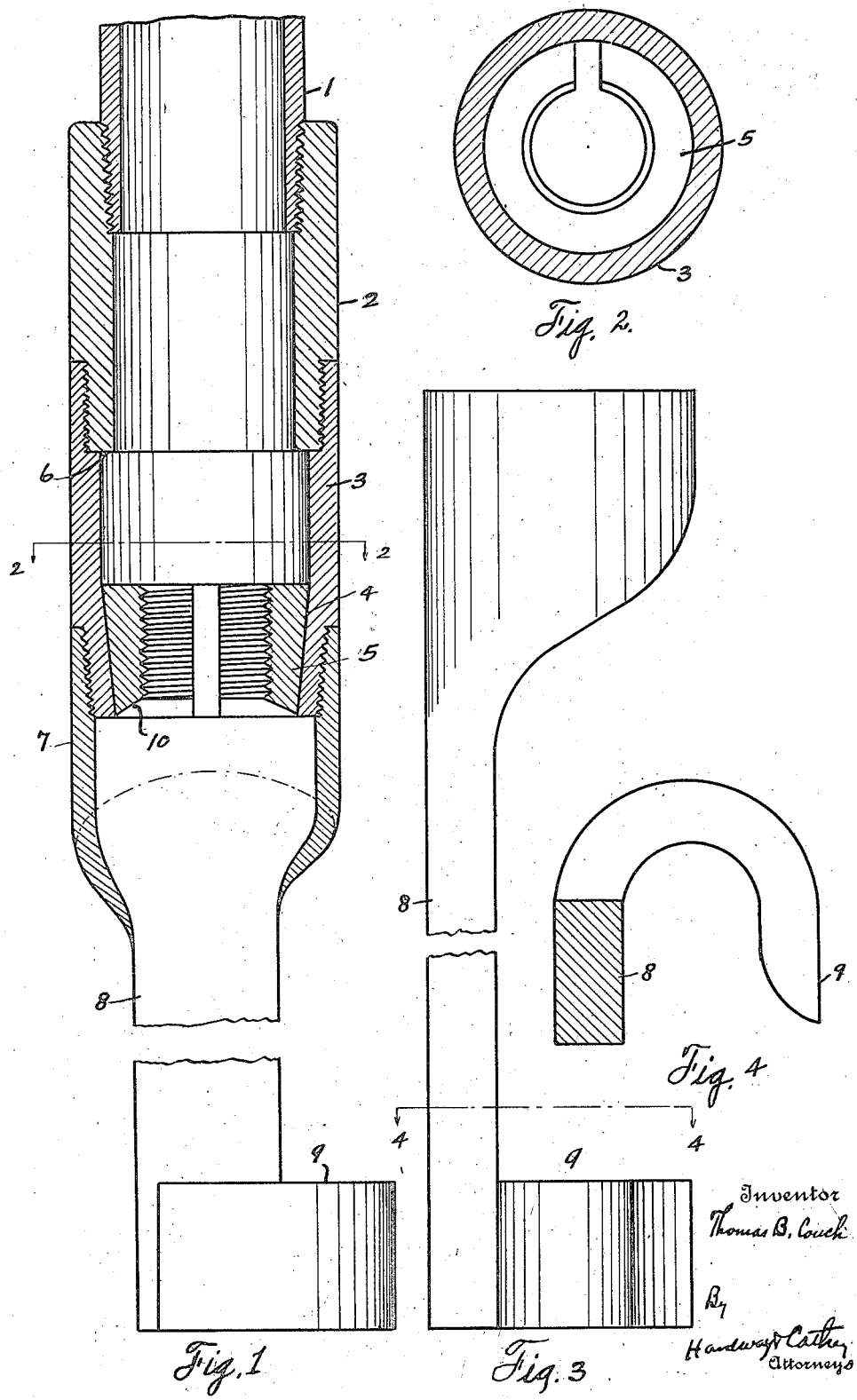
Figure 1 is a vertical sectional view of the device.
Figure 2 is a transverse sectional view taken on the line 2—2 of Figure 1.
Figure 3 shows a side view.
Figure 4 shows a transverse sectional view taken on the line 4—4 of Figure 3.

Referring now more particularly to the drawings the numeral 1 designates a stem or pipe to the lower end of which the coupling 2 is connected. Threaded into the lower end of this coupling there is a nipple 3 whose lower end is externally reduced and threaded. Internally the lower end of the nipple is formed with a slightly tapering seat 4 designed to receive a correspondingly tapered annular expansible jaw 5 which is internally threaded, or serrated. The lower end of the coupling 2 is of somewhat smaller inside diameter than the inside diameter of the nipple forming in effect an internal annular shoulder 6 which is designed to limit the upward movement of the jaw 4.

Threaded onto the lower end of the nipple 3 there is a sleeve 7, and formed integrally with and depending from one side of this sleeve there is a shank 8 whose lower end has the hook 9 preferably formed integrally therewith.

In operation the device is assembled, as shown in Figure 1 and let down into the bore and when the hook 9 has passed below the upper end of the pipe to be pulled the device is then slowly turned and the hook 9 will engage around the pipe some distance below the upper end thereof and pull the upper end thereof from the wall of the bore and thus align the same with the sleeve 7. The device is then lowered, and the lower end of the jaw 5 will strike against the upper end of the pipe and said jaw will be elevated until it is stopped by the shoulders 6. The lower end of this jaw is flared as at 10, for the purpose of causing it to become centered relative to the pipe to be pulled. The device is then further lowered and its weight will force the jaw 6 over said pipe, said jaw expanding sufficiently to permit this. An upward pull is then exerted on the stem 1 causing the jaw to seat and wedge in the tapering seat 5 and grip and securely hold the pipe to be pulled.

What I claim is:—

1. A fishing tool, including a tubular body formed with a downwardly tapering seat, a pipe engaging jaw resting on said tapering seat, a shank depending from said body at one side, a pipe engaging hook carried by the lower end of the shank, said fishing tool being provided with a water course extending therethrough from the upper to the lower end.

2. A fishing tool including a tubular stem, a tubular body fastened to the lower end of said stem and formed with a downwardly tapering seat, and an internal annular shoulder spaced above said seat, an annular expansible jaw resting on said tapering seat and normally spaced below said shoulder, a sleeve fastened to the lower end of said body, a shank formed integrally with said sleeve and depending from one side thereof, a pipe engaging hook carried by the lower end of said shank, said tool having a water course therethrough from end to end.

3. A fishing tool including a tubular stem, a coupling threaded onto the lower end thereof, a nipple threaded onto the lower end of the coupling whose lower end is formed with an internal tapering seat, the coupling having a less inside diameter than the nipple forming, in effect, an annular shoulder spaced above said seat, an annular expansible jaw resting on said seat and internally serrated, a sleeve threaded onto the lower end of said nipple, a shank formed integrally with one side of said sleeve and depending therefrom, a pipe engaging hook carried by the lower end of the shank, said tool having a water course therethrough from end to end.

In testimony whereof I have signed my name to this specification in the presence of two subscribing witnesses.

THOMAS B. COUCH.

Witnesses:
  WM. A. CATHEY,
  E. V. HARDWAY.